Figure 1:
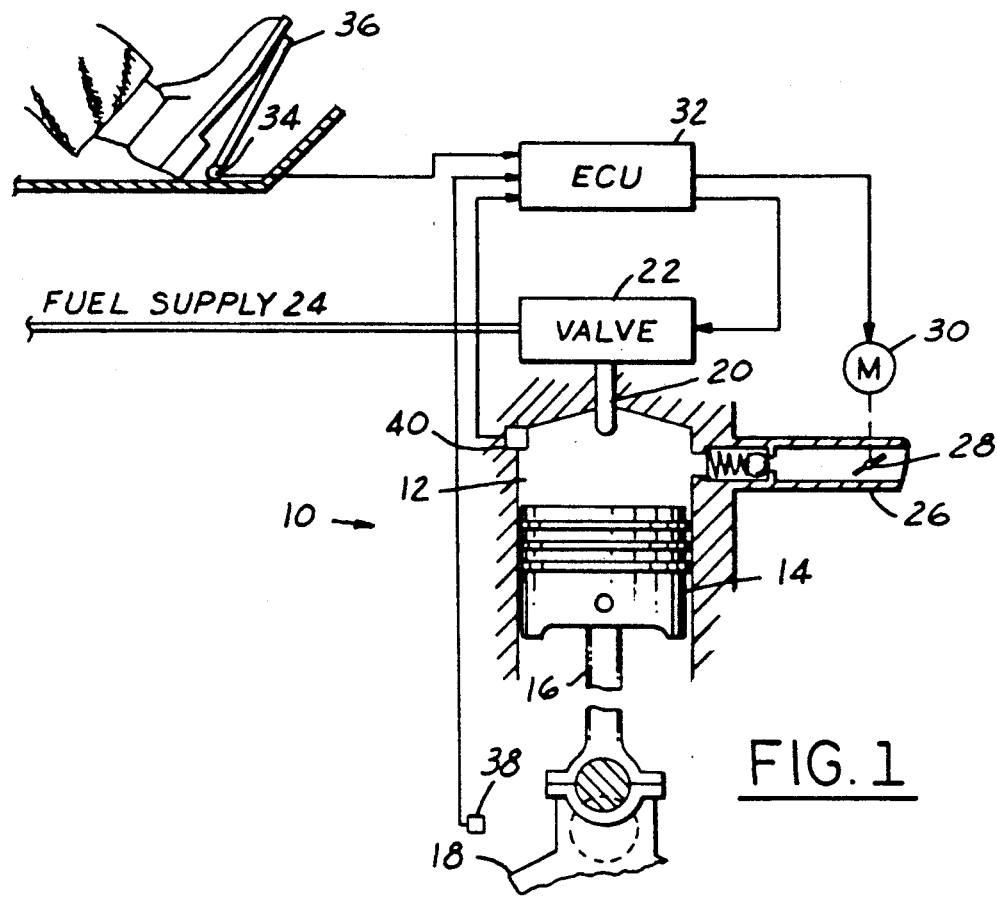

United States Patent [19]

Hoover

[11] Patent Number: 5,018,498
[45] Date of Patent: May 28, 1991

[54] AIR/FUEL RATIO CONTROL IN AN INTERNAL COMBUSTION ENGINE

[75] Inventor: Thomas M. Hoover, Reese, Mich.

[73] Assignee: Orbital Walbro Corporation, Cass City, Mich.

[21] Appl. No.: 445,408

[22] Filed: Dec. 4, 1989

[51] Int. Cl.⁵ .............................................. F02M 7/00
[52] U.S. Cl. ..................................... 123/435; 123/436
[58] Field of Search ......................... 123/425, 435, 436

[56] References Cited

U.S. PATENT DOCUMENTS

| | | | |
|---|---|---|---|
| 4,216,750 | 8/1980 | Kobayashi | 123/435 |
| 4,368,707 | 1/1983 | Leshner et al. | 123/436 |
| 4,463,733 | 8/1984 | Tsai | 123/425 |
| 4,471,741 | 9/1984 | Asik et al. | 123/478 |
| 4,475,506 | 10/1984 | Riordan | 123/436 |
| 4,480,620 | 11/1984 | Tange et al. | 123/478 |
| 4,543,934 | 10/1985 | Morita et al. | 123/435 |
| 4,624,229 | 11/1986 | Matekunas | 123/435 |
| 4,736,724 | 4/1988 | Hamburg et al. | 123/436 |

Primary Examiner—Tony M. Argenbright
Assistant Examiner—Robert E. Mates
Attorney, Agent, or Firm—Barnes, Kisselle, Raisch, Choate, Whittemore & Hulbert

[57] ABSTRACT

In an internal combustion engine that includes at least one cylinder having a piston coupled to an engine crankshaft, a fuel injector coupled to a fuel supply and responsive to electronic signals for feeding fuel from the supply directly into the cylinder, and an air supply that includes a throttle valve responsive to electronic signals for controlling quantity of combustion air fed to the cylinder, a method and system for controlling the air/fuel ratio within the cylinder to obtain combustion at or near the lean limit beyond which the engine misfires. Actual combustion is monitored and compared as a function of crank angle with a predetermined combustion characteristic indicative of operation at the lean burn limit. The throttle valve is controlled as a function of the resulting error signal to restrict air supply to the combustion cylinder so that cylinder combustion approaches the predetermined lean burn characteristic.

6 Claims, 1 Drawing Sheet

AIR/FUEL RATIO CONTROL IN AN INTERNAL COMBUSTION ENGINE

The present invention is directed to control of air/fuel ratio in an internal combustion engine, and more particularly to a method and system for operating an engine at the lean limit of the air/fuel ratio beyond which the engine misfires.

It has heretofore been recognized that many types of internal combustion engines may advantageously be operated at or near the so-called "lean limit" of the air/fuel ratio, beyond which the engine misfires or runs rough. As air/fuel ratio increases toward the lean limit, less combustion energy is lost in pumping work, improving both fuel mileage and engine emissions. However, previous attempts at operating near the air/fuel lean limit, often involving knock sensors and the like for detecting rough engine operation indicative of a too-lean air/fuel ratio, are unduly complex and expensive, exhibit less than desired reliability, and in general have not enjoyed wide acceptance and success.

It is therefore a general object of the present invention to provide a method and apparatus for operating an internal combustion engine at or near the lean limit of the air/fuel ratio that exhibit improved simplicity, reliability and economy as compared with prior techniques of a similar character, and that find particularly advantageous application in so-called direct injection engines where the combustion fuel and air are separately fed directly into the combustion cylinders.

In an internal combustion engine that includes at least one cylinder having a piston coupled to an engine crankshaft, a fuel injector coupled to a fuel supply and responsive to electronic signals for feeding fuel from the supply directly into the cylinder, and an air supply that includes a throttle valve responsive to electronic signals for controlling quantity of combustion air fed to the cylinder, the present invention provides a method and system for controlling the air/fuel ratio within the cylinder to obtain combustion at or near the lean limit beyond which the engine misfires. Actual combustion is monitored and compared as a function of crank angle with a predetermined combustion characteristic indicative of operation at the lean burn limit. The throttle valve is controlled as a function of the resulting error signal to restrict air supply to the combustion cylinder so that cylinder combustion approaches the predetermined lean burn characteristic.

Figure 2:
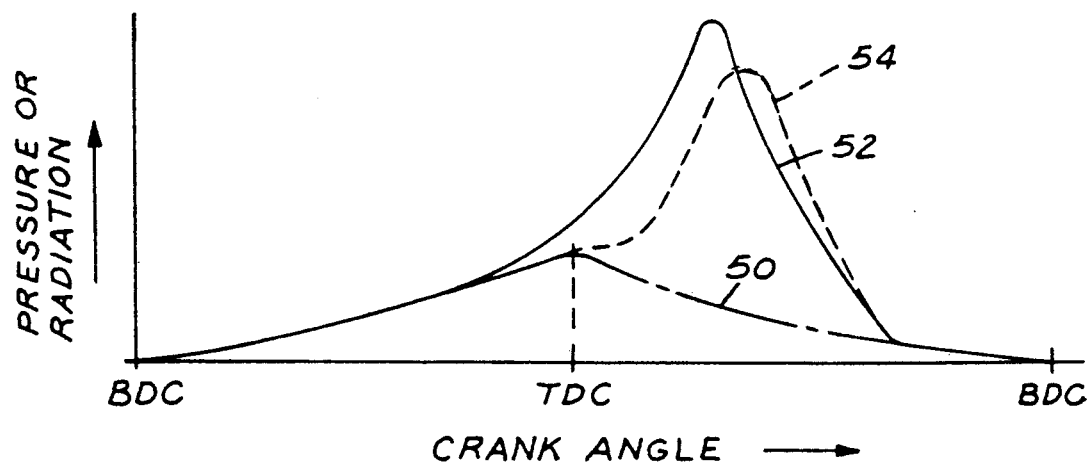

In the preferred implementation of the invention, engine output demanded by the operator is separately sensed, and the fuel injector is operated by an electronic control unit to supply sufficient fuel to the cylinder to satisfy the operator demand. A first sensor coupled to the combustion chamber feeds a signal to the control unit indicative of combustion within the cylinder, and a second sensor coupled to the crankshaft feeds a corresponding signal to the control unit indicative of crank angle. The control unit includes circuitry for comparing actual combustion within the cylinder as a function of crank angle to the predetermined lean-burn combustion characteristic for controlling the air throttle valve to function at or near the lean-burn air/fuel ratio. The combustion sensor may comprise an optical sensor responsive to combustion luminance within the cylinder, or a pressure sensor responsive to increasing pressure of fuel combustion within the cylinder The invention, together with additional objects, features and advantages thereof, will be best understood from the following description, the appended claims and the accompanying drawing in which:

FIG. 1 is a schematic diagram of an engine combustion air/fuel ratio control system in accordance with a presently preferred embodiment of the invention; and FIG. 2 is a graphic illustration useful in describing operation of the invention.

FIG. 1 illustrates an engine 10 that includes at least one cylinder 12 having a piston 14 slidably disposed therewithin and coupled by a rod 16 to an engine crankshaft 18. A fuel injector 20 is mounted at the head of cylinder 12 and is coupled by an electronic valve 22 to a fuel supply 24 for injecting fuel under pressure into cylinder 12 as a function of electronic control signals to valve 22. An engine air intake manifold 26 includes a throttle valve 28 coupled to an electric motor 30 for controlling quantity of air fed through manifold 26 to cylinder 12 as a function of electronic control signals to the motor.

An electronic control unit or ECU 32 receives a first input signal from a sensor 34 coupled to the throttle pedal 36 and thus indicative of operator demand on engine 10. Sensor 34 may take the form of any suitable position sensor. A second sensor 38 is positioned adjacent to crankshaft 18 and feeds a corresponding input signal to ECU 32 indicative of crankshaft position. Sensor 38 may comprise any suitable electromagnetic or optical sensor. A third sensor 40 feeds an input signal to ECU 32 indicative of combustion within cylinder 12. Sensor 40 may comprise a luminance sensor, such as an optical window in the sidewall of cylinder 12 coupled by an optical fiber to a phototransistor or the like within ECU 32, for developing a signal in ECU 32 directly indicative of fuel combustion. Alternatively, sensor 40 may comprise a pressure sensor for developing an electronic signal indicative of fuel combustion as a function of increasing pressure within the engine cylinder.

FIG. 2 is a graphic illustration (idealized and not to scale) of pressure or radiation (luminance) within cylinder 12 as a function of crank angle for differing modes of operation of engine 10. In particular, a curve 50 illustrates pressure or radiation as a function of crank angle during cold motoring of the engine. Even in the absence of fuel combustion, pressure and radiation increase from a minimum at or near bottom dead center (BDC) to a peak at or near top dead center (TDC), and thereafter decrease to a minimum at the next BDC position of the crankshaft. During normal combustion operation illustrated by curve 52, pressure and/or radiation increases from BDC as in cold motoring operation until approaching TDC. After the onset of combustion just prior to TDC, pressure and/or radiation increases at a greater rate than during cold motoring to a peak following TDC, thereafter rapidly decreasing to the minimum at the next BDC position of the crankshaft. (Note that curve 52 applies, and the present invention may be employed in conjunction with, either two-stroke or four-stroke engines.) However, if the air/fuel ratio is too lean—i.e., beyond the lean limit—cylinder pressure and radiation follow the curve 54, which tracks motoring curve 50 up to TDC and thereafter peaks at greater angle between TDC and the next BDC as compared with normal operating curve 52.

Thus, at TDC, or at a crank angle around TDC, there is a significant difference between normal operation along curve 52 and too-lean operation along curve 54, which may be detected at ECU 32 for controlling motor 30 and throttle valve 28. For example, it will be noted that the amplitude of pressure or radiation at TDC is significantly greater along normal operating curve 52 than along too-lean curve 54. Likewise, the slope of normal curve 52 is significantly greater at TDC than along curve 54.

Curve 52 indicative of normal operation at the lean air/fuel ratio limit may be obtained, either empirically or by design, for any given engine configuration, and the corresponding curve characteristics stored within ECU 32. Thereafter, actual operation is monitored by means of sensors 38,40, and compared at ECU 32 with desired lean-limit operation represented by curve 52. For example, ECU 32 may compute the slope of the output from sensor 38 at TDC and compare such slope to the predetermined lean-limit characteristic for the corresponding engine design. Throttle motor 30 may be controlled as a function of any corresponding error signal. In such embodiment, ECU 32 may be of either analog or digital construction. In another implementation having particular utility in microprocessor-based ECU constructions, desired operating curve 52 may be stored as a look-up table in digital memory, either as a single curve with offsets for differing air densities and temperatures, or as a family of curves for differing air densities and air temperatures.

In operation, operator torque demand on engine 10 is established by sensor 34, and ECU sets activation time of valve 22 accordingly. Thus, quantity of fuel injected into cylinder 12 is determined directly by engine operator demand. ECU also establishes an initial desired position for throttle valve 28 based upon various conventional calculations not directly germane to the present invention, and operates motor 30 accordingly. (Throttle valve 28 is often conventionally equipped with a sensor for feeding actual throttle position back to ECU 32.) Thereafter, combustion is monitored as a function of crank angle, compared with desired lean-limit operation represented by curve 52, and valve 28 is adjusted accordingly.

The invention claimed as:

1. A method of controlling air/fuel ratio in an internal combustion engine having at least one cylinder with a piston coupled to a crankshaft, means for injecting combustion fuel directly into said cylinder, means including a throttle valve for controlling quantity of combustion air fed to said cylinder, and means responsive to an operator for setting engine demand, said method comprising the steps of:

(a) sensing engine demand established by the operator,
(b) operating said fuel injecting means as a direct function of sensed demand to inject into said cylinder a quantity of fuel to satisfy said demand,
(c) monitoring combustion in said cylinder, and
(d) adjusting said throttle valve to admit sufficient air into said cylinder to operate at a lean limit of said air/fuel ratio beyond which said engine misfires.

2. The method in set forth in claim 1 wherein said step (c) comprises the steps of (c1) establishing a characteristic for said engine indicative of combustion at said lean limit and (c2) comparing combustion in said cylinder to said established characteristic to develop an error signal, and wherein said step (d) comprises the step of controlling said throttle valve as a function of said error signal.

3. The method set forth in claim 2 wherein said step (c1) comprises the step of establishing said combustion characteristic as a function of engine crank angle, and wherein said step (c2) comprises the step of monitoring combustion in said cylinder as a function of crank angle.

4. The method set forth in claim 3 wherein said step (c2) comprises the step of monitoring luminance in said cylinder as a function of crank angle.

5. The method set forth in claim 3 wherein said step (c2) comprises the step of monitoring pressure in said cylinder as a function of crank angle.

6. In an internal combustion engine that includes at least one cylinder having a piston coupled to a crankshaft, a fuel injector coupled to a fuel supply and responsive to electronic signals for feeding fuel from said supply directly into said cylinder, means for sensing operator demand on said engine, means for supplying electronic control signals to said injector as a function of said demand so as to control injection fuel quantity as a direct formation of operator demand, and means for supplying combustion air to said cylinder including a throttle valve responsive to electronic signals for controlling quantity of combustion air fuel to said cylinder, an electronic system for controlling combustion air/fuel ratio at said cylinder comprising:

means establishing a desired lean-burn combustion characteristic as a function of crank angle, means for monitoring actual combustion in said cylinder as a function of crank angle, means for comparing actual combustion to said combustion characteristic to develop an error signal, and means for supplying electronic control signals to said throttle valve as a function of said error signal to operate said engine at a lean air/fuel ratio limit beyond which said engine misfires.

* * * * *